(12) United States Patent
Yang et al.

(10) Patent No.: US 8,284,172 B2
(45) Date of Patent: Oct. 9, 2012

(54) METHOD FOR DETECTING TWO SENSING AREAS OF PHOTO-SENSOR TOUCH PANEL AND TOUCH-SENSITIVE ELECTRONIC APPARATUS USING THE SAME

(75) Inventors: Chun-Wei Yang, Hsin-Chu (TW);
Yu-Min Hsu, Hsin-Chu (TW);
Yung-Tse Cheng, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 403 days.

(21) Appl. No.: 12/547,482

(22) Filed: Aug. 26, 2009

(65) Prior Publication Data
US 2010/0134442 A1 Jun. 3, 2010

(30) Foreign Application Priority Data
Dec. 3, 2008 (TW) .............................. 97146954 A

(51) Int. Cl.
*G06F 3/042* (2006.01)
(52) U.S. Cl. ..................................... 345/175
(58) Field of Classification Search .................. 345/175
See application file for complete search history.

(56) References Cited

U.S. PATENT DOCUMENTS

| | | | |
|---|---|---|---|
| 2006/0170658 A1* | 8/2006 | Nakamura et al. | 345/173 |
| 2007/0268269 A1 | 11/2007 | Chang et al. | |
| 2007/0285404 A1 | 12/2007 | Rimon et al. | |
| 2008/0259051 A1* | 10/2008 | Ota | 345/175 |
| 2009/0122022 A1* | 5/2009 | Park et al. | 345/173 |
| 2010/0117961 A1* | 5/2010 | Westerman | 345/163 |
| 2010/0123665 A1* | 5/2010 | Birkler | 345/173 |

* cited by examiner

*Primary Examiner* — Chanh Nguyen
*Assistant Examiner* — Long D Pham
(74) *Attorney, Agent, or Firm* — Chun-Ming Shih

(57) ABSTRACT

An exemplary detecting method for a photo-sensor touch panel and a touch-sensitive electronic apparatus using the same are provided. In aforementioned method, an image frame is obtained by scanning the photo-sensor touch panel. Then, a distribution area of data points in the image frame each having a brightness between a predetermined brightness and a first threshold brightness is defined as a first sensing area, and a distribution area of data points in the image frame each having a brightness between the predetermined brightness and a second threshold brightness is defined as a second sensing area. Afterward, it is determined that whether a real touch probably/really occurred according to a relative distance between one of first data points and corresponding one of second data points. The first data points located in the first sensing area, and the second data points located in the second sensing area.

18 Claims, 4 Drawing Sheets

METHOD FOR DETECTING TWO SENSING AREAS OF PHOTO-SENSOR TOUCH PANEL AND TOUCH-SENSITIVE ELECTRONIC APPARATUS USING THE SAME

CROSS-REFERENCE TO RELATED APPLICATIONS

This application is based upon and claims the benefit of priority from the prior Taiwanese Patent Application No. 097146954, filed Dec. 3, 2008, the entire contents of which are incorporated herein by reference.

BACKGROUND

1. Technical Field

The present invention generally relates to touch control technologies and, particularly to a detecting method for a photo-sensor touch panel and a touch-sensitive electronic apparatus using the same.

2. Description of the Related Art

FIG. 1 is a schematic view of illustrating a method for detecting a central position of a touch area sensed by a photo-sensor touch panel, in accordance with the prior art. As illustrated in FIG. 1, the numerical reference 100 represents an image frame obtained by scanning the photo-sensor touch panel (not shown). The image frame 100 is consisted of 256 data points (as labeled by the numerical reference 102) arranged in a matrix of 16 columns and 16 rows.

In the prior art, a distribution area of data points in the image frame 100 each having a brightness lower than a threshold brightness is defined as the touch area, as represented by the shaded area of FIG. 1; a distribution area of data points in the image frame 100 each having a brightness higher than the threshold brightness is defined as a non-touch area, as represented by the white area of FIG. 1. Accordingly, as long as the coordinate values of data points 104, 106, 108 and 110 of the touch area are acquired and a mean value of the coordinate values of the four data points is calculated, a coordinate value of the data point 112 located at the central position of the touch area can be obtained.

However, the above-mentioned method for detecting the central position of the touch area is easily influenced by shadow and light. For example, when the user uses a forefinger to touch the photo-sensor touch panel, a shadow area caused by the hand of the user has an irregular shape, which would result in the defined touch area may also have an irregular shape. Therefore, if the foregoing method for detecting the central position of the touch area is employed, the central position of the real touch area would easily be wrongly determined and thus renders unsatisfactory the accuracy of coordinate positioning of the photo-sensor touch panel.

BRIEF SUMMARY

The present invention relates to a detecting method for a photo-sensor touch panel, facilitating an apparatus with the photo-sensor touch panel to prevent a central position of real touch area from being wrongly determined and thus provide a relatively accurate coordinate positioning.

The present invention further relates to a touch-sensitive electronic apparatus using the detecting method, which can avoid a central position of real touch area to be wrongly determined and thus provide a relatively accurate coordinate positioning.

In order to achieve the above-mentioned advantages, a detecting method for a photo-sensor touch panel, in accordance with an embodiment of the present invention, is provided. In this detecting method, an image frame is firstly obtained by scanning the photo-sensor touch panel; then a distribution area of data points in the image frame each having a brightness between a predetermined brightness and a first threshold brightness is defined as a first sensing area, and a distribution area of data points in the image frame each having a brightness between the predetermined brightness and a second threshold brightness is defined as a second sensing area. Thereafter, it is determined whether a real touch probably/really occurred according to a distance between one of a plurality of first data points and corresponding one of a plurality of second data points. The first data points are located in the first sensing area, and the second data points are located in the second sensing area.

A touch-sensitive electronic apparatus in accordance with another embodiment of the present invention is provided. The touch-sensitive electronic apparatus includes a photo-sensor touch panel and a control circuit. The control circuit is configured (i.e., structured and arranged) for scanning the photo-sensor touch panel to obtain an image frame, defining a distribution area of data points in the image frame each having a brightness between a predetermined brightness and a first threshold brightness as a first sensing area, defining a distribution area of data points in the image frame each having a brightness between the predetermined brightness and a second threshold brightness as a second sensing area, and determining whether a real touch probably/really occurred according to a distance between one of a plurality of first data points and corresponding one of a plurality of second data points. The first data points are located in the first sensing area, and the second data points are located in the second sensing area.

In the above-mentioned embodiments of the present invention, two different threshold brightnesses are used for performing relative operations, one of the threshold brightnesses can be used for finding out a shadow area caused by a pointer shading light, and the other one of the threshold brightnesses can be used for finding out an area in the shadow area which is corresponding to light being shaded by the pointer at a particular level. Then, a relative distance between two data points located at respective corresponding positions of the two areas can be used to determine whether a real touch probably/really occurred. As long as the relative distance is smaller than a predetermined distance, it is determined that a real touch probably/really occurred according to user's definition. Once it is determined that a real touch probably occurred, the amount of data points located in the area which is corresponding to light being shaded at a particular level and having the relative distances smaller than the predetermined distance whether reaches a predetermined number can be further detected, if the detect result is YES, it is determined that a real touch really occurred. Even, when the amount of the data points having the relative distances smaller than the predetermined distance reaches the predetermined number, a width and a length of the foregoing shadow area whether respectively are matched with a width and a length of a predetermined touch object (e.g., a finger) can further be detected, if the width and length of the shadow area respectively are matched with the width and length of the predetermined touch object, it is determined that a real touch really occurred. Accordingly, the present invention can effectively distinguish the real touch position from noise caused by shadow, the central position of the real touch area would not be wrongly determined, so that the influence of shadow and light is slight and the accuracy of coordinate positioning of the photo-sensor touch panel is improved.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
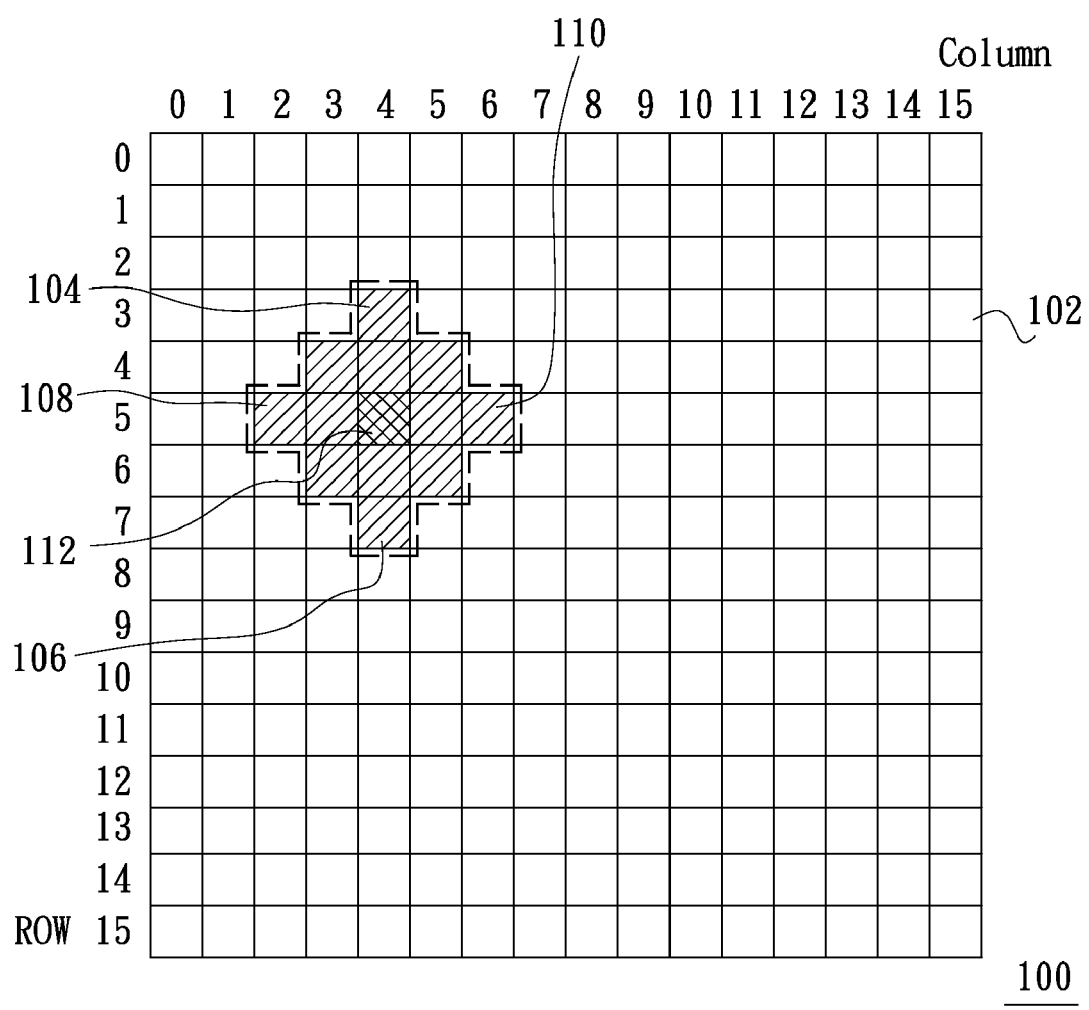
FIG. 1 is a schematic view of illustrating a method for detecting a central position of a touch area sensed by a photo-sensor touch panel, in accordance with the prior art.
Figure 2:
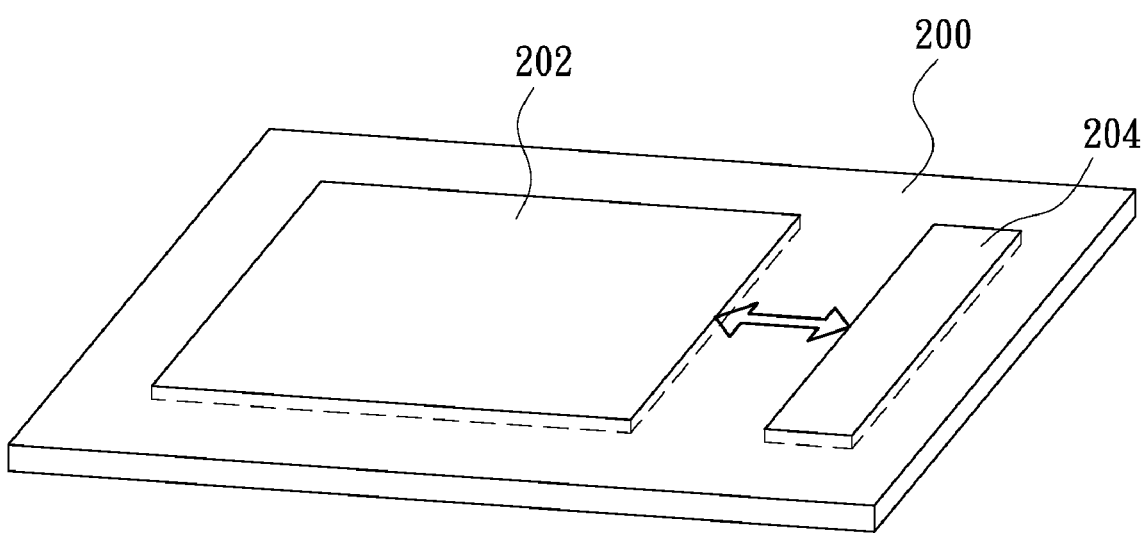
FIG. 2 illustrates a touch-sensitive electronic apparatus in accordance with an embodiment of the present invention.
Figure 3:
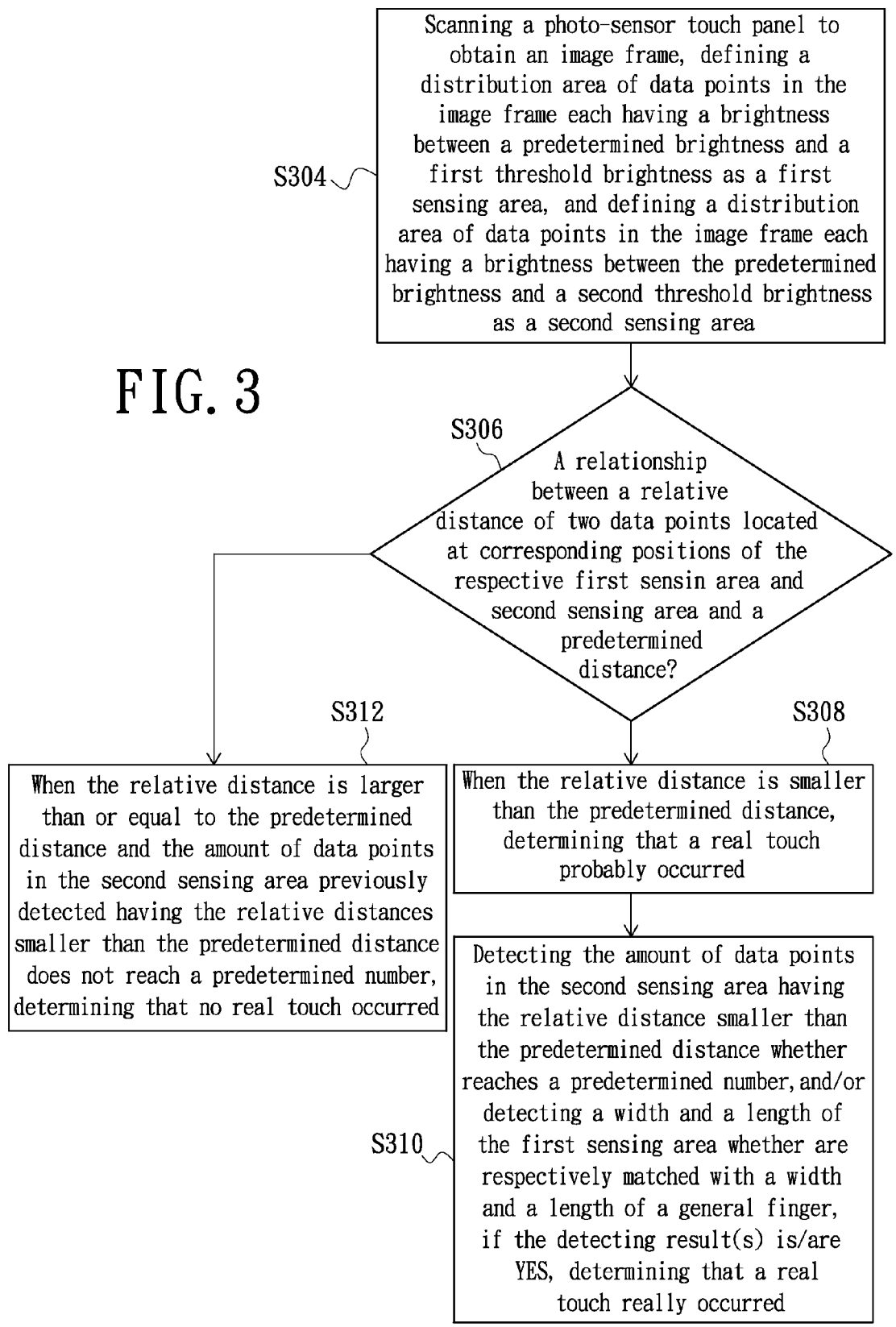
FIG. 3 is a flowchart of a detecting method for a photo-sensor touch panel in accordance with an embodiment of the present invention.

FIG. 2 illustrates a touch-sensitive electronic apparatus in accordance with an embodiment of the present invention. The touch-sensitive electronic apparatus 200 includes a photo-sensor touch panel 202 and a control circuit 204. FIG. 3 is a flowchart of a detecting method for a photo-sensor touch panel in accordance with an embodiment of the present invention. Please refer to FIG. 2 and FIG. 3 according to the need of description. The control circuit 204 is configured (i.e., structured and arranged) for scanning the photo-sensor touch panel 202 to obtain an image frame, defining a distribution area of data points in the image frame each having a brightness between a predetermined brightness and a first threshold brightness as a first sensing area, and defining a distribution area of data points in the image frame each having a brightness between the predetermined brightness and a second threshold brightness as a second sensing area (as illustrated by the step S304 of FIG. 3). Generally speaking, the implementation of the step S304 has two approaches: one approach is that data of a whole image frame are firstly obtained and then the sensing areas are defined; the other one approach is that the obtainment of data of an image frame and the definition of the sensing areas are performed in parallel. For the convenience of description, the approach of obtaining data of a whole image frame will be firstly described as follows.

Figure 4:
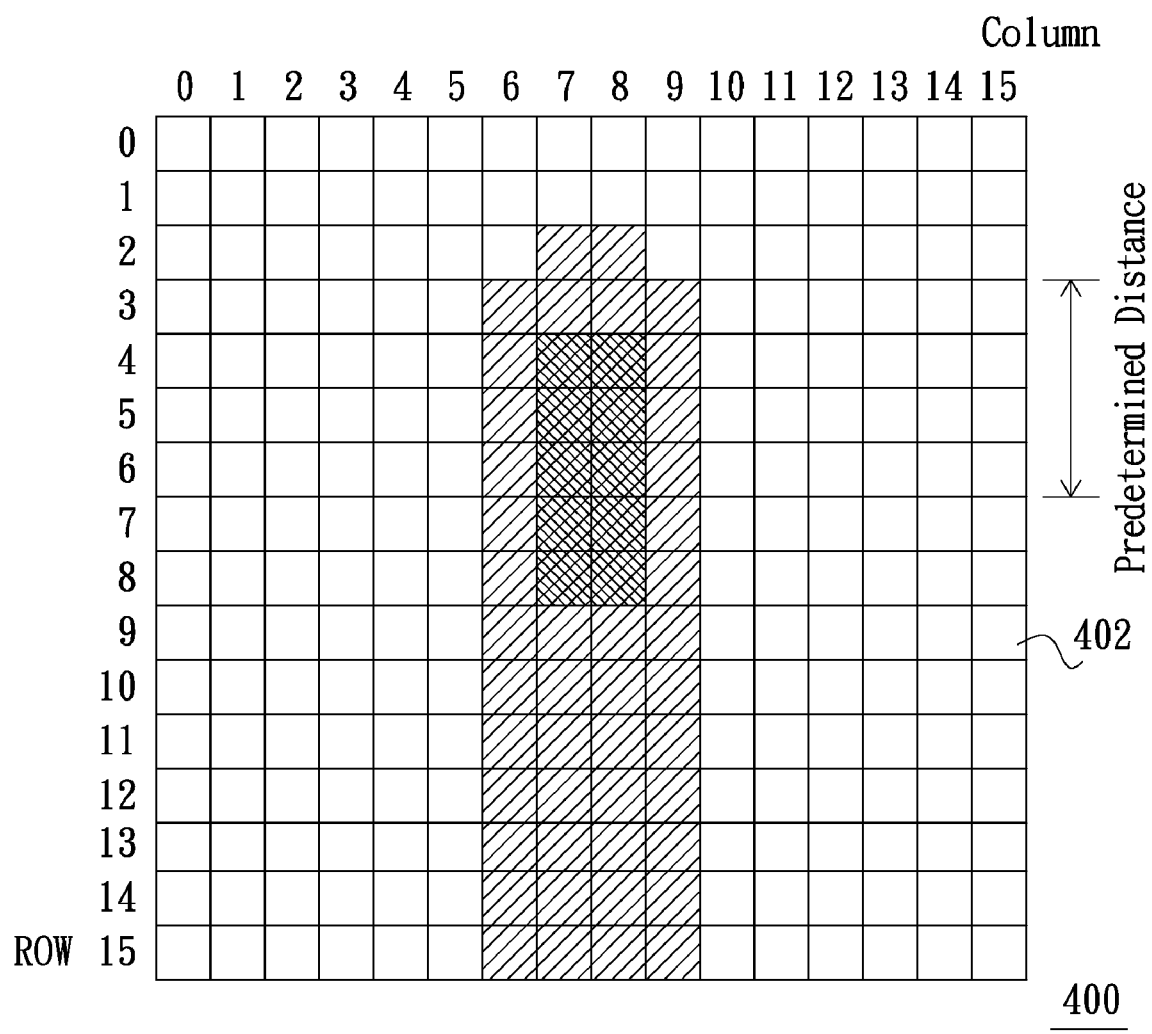
FIG. 4 is an explanation diagram illustrating sensing areas which are defined according to the step S304 of FIG. 3.

Assuming that the second threshold brightness is lower than the first threshold brightness, and the second threshold brightness is higher than the predetermined brightness; the sensing areas defined in the step S304 can be explained with reference to FIG. 4. FIG. 4 is an explanation diagram illustrating the sensing areas which are defined according to the step S304. As illustrated in FIG. 4, the numerical reference 400 represents an image frame obtained by scanning the photo-sensor touch panel 202. The image frame 400 is consisted of 256 data points (as labeled by the numerical reference 402) arranged in a matrix of 16 columns and 16 rows. In addition, in the colored areas of FIG. 4, the light colored area is the defined first sensing area, for example a shadow area caused by a forefinger shading light; the deep colored area is the defined second sensing area, i.e., an area in the shadow area corresponding to light being shaded at a particular level.

Please refer to FIG. 3 and FIG. 4 according to the need of description. After completing the step S304, the control circuit 204 can arbitrarily select two corresponding data points from the respective first sensing area and second sensing area and then detect a relationship between a relative distance of the two selected data points and a predetermined distance (as illustrated by step S306 of FIG. 3). In the present embodiment, in order to conveniently calculate the relative distance and satisfy the current scan mode (i.e., scanning from $0^{th}$ row to $15^{th}$ row, starting at $0^{th}$ column and ending at $15^{th}$ column for each row scanning), the control circuit 204 takes data points of the two sensing areas located at a same column as corresponding data points and uses data points at edges of the first sensing area to calculate the relative distance, detailed description will be made with reference to FIG. 4.

Referring to FIG. 4, in regard to the so called corresponding data points, data points in $7^{th}$ column of FIG. 4 are taken as an example, in the data points of the $7^{th}$ column, data points belong to the first sensing area are the corresponding data points of data points belong to the second sensing area; likewise, the data points belong to the second sensing area are the corresponding data points of the data points belong to the first sensing area. The so-called data points at the edges of the first sensing area each is the first data point in each column of the first sensing area under the scan mode of scanning from $0^{th}$ row to $15^{th}$ row. In FIG. 4, the so-called data points at the edges of the first sensing area are the data point with a coordinate of $2^{nd}$ row of $7^{th}$ column, the data point with a coordinate of $2^{nd}$ row of $8^{th}$ column, the data point with a coordinate of $3^{rd}$ row of $6^{th}$ column and the data point with a coordinate of $3^{rd}$ row of $9^{th}$ column, and respectively represented by data point (7, 2), data point (8, 2), data point (6, 3) and data point (9, 3). In addition, in this example, the approach of calculating the relative distance is carried out by calculating a distance of two sides of the two selected data points, the two sides are the two nearest sides of eight sides of the two selected data points and parallel to the direction of row.

Still referring to FIG. 3 and FIG. 4, assuming that the control circuit 204 selects the data point (7, 2) of the first sensing area and the data point (7, 6) of the second sensing area to calculate the relative distance, and assuming that the predetermined distance is equal to the length of predetermined distance as illustrated in FIG. 4; under these assumptions, the control circuit 204 will detect a relationship between the relative distance of the two selected data points and the predetermined distance. Since the relative distance of the two selected data points is smaller than the predetermined distance, the control circuit 204 would determine that a real touch probably occurred in the vicinity of the data point (7, 6) (as illustrated by the step S308 of FIG. 3). Once it is determined that a real touch probably occurred in the vicinity of the data point (7, 6), the control circuit 204 will look for other data points in the vicinity of the data point (7, 6) each having the relative distance smaller than the predetermined distance and belonging to the second sensing area, and detect the amount of the data points of the second sensing area having the relative distances smaller than the predetermined distance whether reaches a predetermined number. Once the detect result is YES, the control circuit 204 will determine that a real touch really occurred (as illustrated by the step S310 of FIG. 3), detailed description will be made with reference to FIG. 4.

Assuming that the predetermined number is six data points, as illustrated in FIG. 4, the control circuit 204 finally detects that the relative distances of the data point (7, 6), data point (8, 6), data point (7, 5), data point (8, 5), data point (7, 4) and data point (8, 4) are smaller than the predetermined distance and the amount of these data points reaches the predetermined number. Therefore, the control circuit 204 will determine that a real touch really occurred at the area where the six data points located and take the area as a real touch area, and then calculates a central position of the real touch area.

Still referring to FIG. 3 and FIG. 4, in another embodiment, assuming that the control circuit 204 selects the data point (7, 2) of the first sensing area and the data point (7, 8) to calculate the relative distance, the control circuit 204 will detect that the relative distance of the two selected data points is larger than the predetermined distance. Subsequently, the control circuit 204 detects, along a direction toward the $0^{th}$ row in the manner of row by row and starting from the data point (7, 8), whether a data point having the relative distance smaller that the predetermined distance is existed in the second sensing area, and counts the amount of data points having the relative distances smaller than the predetermined distance. Once the control circuit 204 detects the amount of the data points of the second sensing area having the relative distances smaller than the predetermined distance does not reach the predetermined number, the control circuit 204 will determine that no real touch occurred in the vicinity of the data point (7, 8) and it only is a noise caused by shadow (as illustrated by the step S312 of FIG. 3). In other words, in the area corresponding to light being shaded at a particular level, as long as the amount of data points having the relative distances smaller than the predetermined distance is not enough, the area will be considered as a shadow and thus such a situation is excluded.

Based upon the above-mentioned description, it is known that as long as the first threshold brightness, the second threshold brightness, the predetermined distance and the predetermined number are suitably set, the real touch area and the noise caused by shadow could be effectively distinguished and thus the central position of the real touch area would be not wrongly determined. Accordingly, the influence of shadow and light applied to the present detecting method is slight and the accuracy of coordinate positioning of the photo-sensor touch sensor is improved.

Hereinafter, another approach of determining whether a real touch occurred will be described. During scanning the photo-sensor touch panel 202 row by row, the control circuit 204 simultaneously counts the amount of data points of the second sensing area having the relative distances smaller than the predetermined distance. Detailed description will be made with reference to the image frame 400 of FIG. 4. As illustrated in FIG. 4, during scanning from $0^{th}$ row to $4^{th}$ row, since the acquisition of data points in each row starts from $0^{th}$ column and ends at $15^{th}$ column, the control circuit 204 will firstly obtain the data point (7, 4) of the second sensing area. Because the relative distance between the data point (7, 4) and the data point (7, 2) is smaller than the predetermined distance, the control circuit 204 thus determines a real touch probably occurred in the vicinity of the data point (7, 4). Thereafter, the control circuit 204 takes the data point (7, 4) as an initial data point of the second sensing area, detects data points along the direction from left to right under the scan mode of scanning top to bottom, and counts the amount of data points of the second sensing area having the relative distances smaller than the predetermined distance.

Accordingly, after detecting the relative distance of the two selected data points (7, 4) and (7, 2) is smaller than the predetermined distance, the control circuit 204 sequentially detects the relative distances between the two data points with coordinates of (8, 4) and (8, 2), between the two data points with coordinates of (7, 5) and (7, 2), between the two data points with coordinates of (8, 5) and (8, 2), between the two data points with coordinates of (7, 6) and (7, 2), and between the two data points with coordinates of (8, 6) and (8, 2) all are smaller than the predetermined distance, and furthermore the amount of the data points of the second sensing area having the relative distances smaller than the predetermined distance so far reaches the predetermined number (i.e., six data points). Therefore, the control circuit 204 determines a real touch really occurred at the area where the data point (7, 4), data point (8, 4), data point (7, 5), data point (8, 5), data point (7, 6) and data point (8, 6) located. An advantage of such a row by row detecting approach is that the achievement of touch detection only needs a small quantity of memory.

It is indicated that, in the foregoing embodiments, the control circuit 204 ought to count the amount of data points belonging to the second sensing area in the shadow area caused by the forefinger. Furthermore, if the shadow area appears multiple fingers or a shape of an entire palm, the control circuit 204 ought to count the amount of data points belonging to the second sensing area in the shadow area caused by each finger. As a result, the recognition of multi-touch can be realized.

In addition, although in the description of the foregoing embodiments, the control circuit 204 considers the data points of the two sensing areas in a same column as corresponding data points and uses the data point in the same column and first belonging to the first sensing area to calculate the relative distance under the current scan mode (i.e., scanning from $0^{th}$ row to $15^{th}$ row, starting from $0^{th}$ column and ending at $15^{th}$ column in each row scanning). It is understood that the control circuit 204 also can use other approach to calculate the relative distance, for example takes data points of the two sensing areas in a same row as corresponding data points and uses the data points in the same row and respectively first and last belonging to the first sensing area to calculate the relative distances under the current scan mode, detailed description will be made with reference to FIG. 4.

Referring to FIG. 4, the data points in $4^{th}$ row of FIG. 4 are taken as an example. In the data points of $4^{th}$ row, data points belonging to the first sensing area are corresponding data points of data points belonging to the second sensing area; likewise, the data points belonging to the second sensing area are corresponding data points of the data points belonging to the first sensing area. The so-called data points in the same row and respectively first and last belonging to the first sensing area under current scan mode, as illustrated in FIG. 4, are the data point (7, 2), data point (8, 2) and data points belonging to the first sensing area and located in $6^{th}$ column and $9^{th}$ column.

Accordingly, the control circuit 204 also can detect the relative distances between the two data points with coordinates of (7, 4) and (6, 4), between the two data points with coordinates of (8, 4) and (9, 4), between the two data points with coordinates of (7, 5) and (6, 5), between the two data points with coordinates of (8, 5) and (9, 5), between the two data points with coordinates of (7, 6) and (6, 6), between the two data points with coordinates of (8, 6) and (9, 6), between the two data points with coordinates of (7, 7) and (6, 7), between the two data points with coordinates of (8, 7) and (9, 7), between the two data points with coordinates of (7, 8) and (6, 8) and between the two data points with coordinates of (8, 8) and (9, 8), besides the relative distances between the two data points with coordinates of (7, 4) and (7, 2) and between the two data points with coordinates of (8, 4) and (8, 2). When all the detected relative distances are smaller than the predetermined distance, the control circuit 204 determines that a real touch probably occurred at the area where the data point (7, 4), data point (8, 4), data point (7, 5), data point (8, 5), data point (7, 6), data point (8, 6), data point (7, 7), data point (8, 7), data point (7, 8) and data point (8, 8) located. Thereafter, the control circuit 204 can further detect the amount of the data points in the second sensing area having the relative distances smaller than the predetermined distance whether reaches the predetermined number. As a result, the probability of real touch area being wrongly determined for the touch-sensitive electronic apparatus 200 can be decreased.

Furthermore, when the amount of the data points having the relative distances smaller than the predetermined distance reaches the predetermined number, the control circuit 204 can further detect a width and a length of the first sensing area (i.e., the shadow area caused by a forefinger shading light) whether are respectively matched with a width and a length of a general finger (referring to the step S310 of FIG. 3), if the width and length of the first sensing area are respectively matched with the width and length of the general finger, the control circuit 204 determines a real touch really occurred. As a result, the probability of real touch area being wrongly determined for the touch-sensitive electronic apparatus 200 can be further decreased. Of course, the control circuit 204 is not limited to detect the width and length of the first sensing area whether are respectively matched with the width and length of the general finger, if the first sensing area is a shadow area caused by other predetermined touch object (e.g., a pointing stick) shading light, the control circuit 204 can detect the width and length of the first sensing area whether are respectively matched with a width and a length of the predetermined touch object instead.

In another embodiment, when a real touch probably occurred is determined according to the relationship between the relative distance and the predetermined distance, a real touch really occurred can be further determined only according to the condition that the width and length of the first sensing area whether are respectively matched with the width and length of the predetermined touch object (e.g., a general finger) (referring to the step S310 of FIG. 3). In still another embodiment, a real touch really occurred can be directly determined according to the condition that the relative distance whether is smaller than the predetermined distance. In other words, the user can freely define the determination result according to practical requirements.

Additionally, in the above-mentioned various embodiments, the control circuit 204 can use a first percentage and a second percentage of an average brightness of image frame to respectively define the first threshold brightness and the second threshold brightness. Of course, the average brightness of image frame includes an average brightness of a previous image frame obtained by scanning the photo-sensor touch panel 202 before the image frame 400.

In summary, in the above-mentioned embodiments of the present invention, two different threshold brightnesses are used for performing relative operations, one of the threshold brightnesses can be used for finding out a shadow area caused by a pointer shading light, and the other one of the threshold brightnesses can be used for finding out an area in the shadow area which is corresponding to light being shaded by the pointer at a particular level. Then, a relative distance between two data points located at respective corresponding positions of the two areas can be used to determine whether a real touch probably/really occurred. As long as the relative distance is smaller than a predetermined distance, it is determined that a real touch probably/really occurred according to user's definition. Once it is determined that a real touch probably occurred, the amount of data points located in the area which is corresponding to light being shaded at a particular level and having the relative distances smaller than the predetermined distance whether reaches a predetermined number can be further detected, if the detect result is YES, it is determined that a real touch really occurred. Even, when the amount of the data points having the relative distances smaller than the predetermined distance reaches the predetermined number, a width and a length of the foregoing shadow area whether respectively are matched with a width and a length of a predetermined touch object (e.g., a finger) can further be detected, if the width and length of the shadow area respectively are matched with the width and length of the predetermined touch object, it is determined that a real touch really occurred. Accordingly, the present invention can effectively distinguish the real touch position from noise caused by shadow, the central position of the real touch area would not be wrongly determined, so that the influence of shadow and light is slight and the accuracy of coordinate positioning of the photo-sensor touch panel is improved.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A detecting method for a photo-sensor touch panel, comprising:
    scanning the photo-sensor touch panel to obtain an image frame;
    defining a distribution area of data points in the image frame each having a brightness between a predetermined brightness and a first threshold brightness as a first sensing area, and defining a distribution area of data points in the image frame each having a brightness between the predetermined brightness and a second threshold brightness as a second sensing area; and
    determining whether a real touch probably occurred according to a relative distance between one of a plurality of first data points and corresponding one of a plurality of second data points, wherein the first data points are located in the first sensing area and the second data points are located in the second sensing area,
    wherein when the relative distance is smaller than a predetermined distance, determining that a real touch probably occurred,
    wherein when it is determined that a real touch probably occurred, detecting the amount of the second data points having the relative distances smaller than the predetermined distance whether reaches a predetermined number, if the detecting result is YES, determining that a real touch really occurred, and
    wherein the step of detecting the amount of the second data points having the relative distances smaller than the predetermined distance comprises:
    counting the amount of data points in the second sensing area located at a same row with an initial second data point which is firstly used to calculate the relative distance, along a predetermined direction whereby the initial second data point is taken as start point; and
    determining the amount of the second data points having the relative distances smaller than the predetermined distance whether reaches the predetermined number according to the counting result.

2. The detecting method as claimed in claim 1, further comprising:
    taking data points of the first and second data points which are located in a same column as corresponding first and second data points.

3. The detecting method as claimed in claim 1, further comprising:
    taking data points of the first and second data points which are located in a same row as corresponding first and second data points.

4. The detecting method as claimed in claim 1, wherein when the relative distance is larger than or equal to the predetermined distance and the amount of the previously detected second data point(s) having the relative distance(s) smaller than the predetermined distance does not reach a predetermined number, determining that no real touch occurred.

5. The detecting method as claimed in claim 1, wherein the first data points are located at edges of the first sensing area.

6. The detecting method as claimed in claim 1, wherein when it is detected that the relative distance of one of the second data points is larger than or equal to the predetermined distance and the amount of second data points previously detected having the relative distances smaller than the predetermined distance does not reach the predetermined number, determining that no real touch occurred.

7. The detecting method as claimed in claim 1, further comprising:
using a first percentage and a second percentage of an average brightness of image frame to respectively define the first threshold brightness and the second threshold brightness.

8. The detecting method as claimed in claim 7, wherein the average brightness of image frame comprises an average brightness of a previous image frame obtained by scanning the photo-sensor touch panel before the image frame.

9. The detecting method as claimed in claim 1, wherein when the relative distance is smaller than a predetermined distance, directly determining that a real touch really occurred rather than probably occurred.

10. A touch-sensitive electronic apparatus comprising:
a photo-sensor touch panel; and
a control circuit configured for scanning the photo-sensor touch panel to obtain an image frame, defining a distribution area of data points in the image frame each having a brightness between a predetermined brightness and a first threshold brightness as a first sensing area, defining a distribution area of data points in the image frame each having a brightness between the predetermined brightness and a second threshold brightness as a second sensing area, and determining whether a real touch probably occurred according to a relative distance between one of a plurality of first data points and corresponding one of a plurality of second data points, wherein the first data points are located in the first sensing area and the second data points are located in the second sensing area,
wherein when the relative distance is smaller than a predetermined distance, the control circuit determines that a real touch probably occurred,
wherein when it is determined that a real touch probably occurred, the control circuit further detects the amount of the second data points having the relative distances smaller than the predetermined distance whether reaches a predetermined number, if the detect result is YES, the control circuit determines that a real touch really occurred, and
wherein during the control circuit detecting the amount of the second data points having the relative distances smaller than the predetermined distance, the control circuit counts the amount of data points in the second sensing area located in a same row with an initial second data point which is firstly used to calculate the relative distance, along a predetermined direction whereby the initial second data point is taken as start point, and then determines the amount of the second data points having the relative distances smaller than the predetermined distance whether reaches the predetermined number according to the count result.

11. The touch-sensitive electronic apparatus as claimed in claim 10, wherein the control circuit takes data points of the first and second data points which are located in a same column as corresponding first and second data points.

12. The touch-sensitive electronic apparatus as claimed in claim 10, wherein the control circuit takes data points of the first and second data points which are located in a same row as corresponding first and second data points.

13. The touch-sensitive electronic apparatus as claimed in claim 10, wherein when the relative distance is larger than or equal to the predetermined distance and the amount of the second data points previously detected by the control circuit having the relative distances smaller than the predetermined distance does not reach a predetermined number, the control circuit determines that no real touch occurred.

14. The touch-sensitive electronic apparatus as claimed in claim 10, wherein the first data points are located at edges of the first sensing area.

15. The touch-sensitive electronic apparatus as claimed in claim 10, wherein when the control circuit detects that the relative distance of one of the second data points is larger than or equal to the predetermined distance and the amount of the second data points previously detected having the relative distances smaller than the predetermined distance does not reach the predetermined number, the control circuit determines that no real touch occurred.

16. The touch-sensitive electronic apparatus as claimed in claim 10, wherein the control circuit uses a first percentage and a second percentage of an average brightness of image frame to respectively define the first threshold brightness and the second threshold brightness.

17. The touch-sensitive electronic apparatus as claimed in 16, wherein the average brightness of image frame comprises an average brightness of a previous image frame obtained by scanning the photo-sensor touch panel before the image frame.

18. The touch-sensitive electronic apparatus as claimed in claim 10, wherein when the relative distance is smaller than a predetermined distance, the control circuit directly determines that a real touch really occurred rather than probably occurred.

* * * * *